(12) United States Patent
Fukui

(10) Patent No.: US 7,335,703 B2
(45) Date of Patent: Feb. 26, 2008

(54) POLYOLEFIN GRAFT COPOLYMER PREPARED IN THE PRESENCE OF COORDINATION POLYMERIZATION CATALYST BASED ON LATE TRANSITION METAL COMPLEX AND METHOD FOR MAKING THE SAME

(75) Inventor: Yoshifumi Fukui, Toyonaka (JP)

(73) Assignee: Kaneka Corporation, Osaka (JP)

( * ) Notice: Subject to any disclaimer, the term of this patent is extended or adjusted under 35 U.S.C. 154(b) by 371 days.

(21) Appl. No.: 10/487,274

(22) PCT Filed: Aug. 7, 2002

(86) PCT No.: PCT/JP02/08104

§ 371 (c)(1),
(2), (4) Date: Feb. 20, 2004

(87) PCT Pub. No.: WO03/020779

PCT Pub. Date: Mar. 13, 2003

(65) Prior Publication Data

US 2004/0242790 A1 Dec. 2, 2004

(30) Foreign Application Priority Data

Aug. 31, 2001 (JP) ............................. 2001-264819

(51) Int. Cl.
*C08F 265/04* (2006.01)
(52) U.S. Cl. .................. 525/245; 525/246; 525/259; 525/319; 525/322; 526/328; 526/329.7; 526/348; 526/90

(58) Field of Classification Search ................ 525/244, 525/245, 246, 259, 319, 322; 526/329.7, 526/328, 348
See application file for complete search history.

(56) References Cited

U.S. PATENT DOCUMENTS

| | | | |
|---|---|---|---|
| 3,476,831 A | * | 11/1969 | Daumiller et al. .......... 525/244 |
| 5,164,454 A | * | 11/1992 | Suga et al. ................. 525/309 |
| 2004/0171779 A1 | * | 9/2004 | Matyjaszewski et al. 526/303.1 |

FOREIGN PATENT DOCUMENTS

| | | |
|---|---|---|
| EP | 864593 A1 | 9/1998 |
| JP | 2000-95825 A | 4/2000 |
| JP | 2000-128924 A | 5/2000 |
| JP | 2000-154255 A | 6/2000 |
| JP | 2002-167413 A | 6/2002 |
| WO | WO 94/07930 A1 | 4/1994 |
| WO | WO 97/17380 A2 | 5/1997 |
| WO | WO 97/48740 A1 | 12/1997 |
| WO | WO 99/62965 A1 | 12/1999 |
| WO | WO 99/65963 A1 | 12/1999 |

* cited by examiner

*Primary Examiner*—Roberto Rabago
(74) *Attorney, Agent, or Firm*—Sughrue Mion, PLLC

(57) ABSTRACT

A novel polyolefin graft copolymer prepared by graft-copolymerizing an olefin monomer with a (meth)acryl macromonomer or an isobutylene macromonomer in the presence of a coordination polymerization catalyst based on a late transition metal complex and a method for making the novel polyolefin graft copolymer are provided.

6 Claims, No Drawings ated macromonomer (e.g., polystyrene; use of polyisobu-
POLYOLEFIN GRAFT COPOLYMER PREPARED IN THE PRESENCE OF COORDINATION POLYMERIZATION CATALYST BASED ON LATE TRANSITION METAL COMPLEX AND METHOD FOR MAKING THE SAME This is a National Stage of PCT application PCT/JP02/08104 filed on Aug. 7, 2002, claiming priority to Japanese Application No. 2001-264819 filed Aug. 31, 2001.

TECHNICAL FIELD

The present invention relates to a novel polyolefin graft copolymer prepared in the presence of a coordination polymerization catalyst based on a late transition metal complex, and to a method for making the novel polyolefin graft copolymer.

BACKGROUND ART

Graft copolymers, because of their structural features, are effectively used as functional polymers such as functionalizing agents for polymers, surfacing agents, compatibilizers for polymer blends, and surfactants for polymer/filler compound materials. Polyolefin graft copolymers are typically prepared by grafting of vinyl monomers to polyolefins via free radicals; however, the grafting efficiency is basically low.

A Ziegler-Natta catalyst and a more recent metallocene catalyst are famous as the coordination polymerization catalysts for olefins. Since these early transition metal-based catalysts have low tolerance to polar compounds in particular, processes such as copolymerization of olefins with monomers having protected functional groups or functional group precursor monomers, formation of functional groups, and then graft polymerization initiating from functional groups or coupling with other reactive polymer, are necessary in order to form various graft copolymers. Here the term "tolerance" means that polar compounds do not readily coordinate with complexes or catalyst activated species and, even if they did, they do not readily become inert. It also means that catalyst do not readily react with polar compounds or do not readily decompose.

Another effective method for making graft copolymers in the presence of olefin coordination polymerization catalysts is graft polymerization of olefins and macromonomers (also referred to as macromers). Japanese Examined Patent Application Publication No. 54-10996 discloses a method for preparing a copolymer of α-olefin and an α-olefin-terminated macromonomer (e.g., polystyrene; use of polyisobutylene is also disclosed although this does not relate to the anionic polymerization) prepared by anionic polymerization in the presence of a Ziegler catalyst. However, since bulky monomers rarely coordinate, the grafting efficiency is normally low. Use of early transition metal complexes, which have low tolerance to polar materials, is particularly disadvantageous in conducting graft copolymerization of (meth) acryl macromonomer or graft copolymerization in air, in the presence of moisture, in the presence of wet materials, in the presence of polar compounds, or in water.

As illustrated in the reviews of Chem. Rev. 2000, 100, 1169, Yuki Gosei Kagaku Kyokaishi (Journal of Synthetic Organic Chemistry, Japan), 2000, 58, 293, and Angew. Chem. Int. Ed. 2002, 41, 544; and in WO 97/17380, WO 97/48740, Chem. Commun. 200, 301, Macromol. Symp. 2000, 150, 53, Macromolecules, 2001, 34, 1165, and Macromolecules, 2001, 34, 2022, coordination polymerization catalysts based on late transition metal complexes are now drawing much attention since these catalysts have high tolerance to polar compounds such as polar monomer (e.g., polar vinyl monomers such as (meth)acrylate) and polar solvents (e.g., tetrahydrofuran, ethers, acetones, ethy acetate, and water). Macromol. Chem. Phys. 2000, 201, 1823 reports graft copolymerization for ethyelene and a polystyrene macromonomer (prepared from polystyrene living anions and allyl bromide) using a palladium complex containing an α-diimine ligand. However, the copolymerization was conducted in argon atmosphere and nearly all ingredients were dry ingredients. No report has been present regarding graft copolymerization of olefins and (meth)acryl macromonomers and graft copolymerization in air, in the presence of moisture, in the presence of wet materials, in the presence of polar compounds, or in water.

Japanese Unexamined Patent Application Publication No. 10-316711 also discloses a polyolefin-polyisobutylene graft copolymer. Since this technology uses a C2-symmetrical crosslink metallocence catalyst, the resulting polyolefin from α-olefin having at least three carbon atoms has stereoregularity. [It was reported that since bulky monomers do not readily coordinate to nonsymmetrical and noncrosslink metallocence catalysts, e.g., bis(cyclopentadienyl)zirconocene, ethylene and propylene macromonomers (synthesized by selective β-methy elimination in propylene polymerization with bis(pentamethylcyclopentadienyl) zirconocene) do not copolymerize with each other (Macromol. Symp. Phys. 1995, 97, 161).] However, no report is present regarding polypropylene (PP)/polyisobutylene (PIB) graft copolymers, which has no stereoregularity (atactic), i.e., is amorphous, and has a high grafting efficiency or regarding methods for making such copolymers. As is described above, since the tolerance to polar compounds is low, the graft copolymerization is difficult in air, in the presence of moisture, in the presence of wet material, in the presence of polar compounds, or in water.

DISCLOSURE OF INVENTION

The present invention aims to overcome the above-described problems encountered in graft copolymerization of olefins and (meth)acryl macromonomers or isobutylene macromonomers and to provide a novel polyolefin graft copolymer. The present invention also provides a composite material containing the graft copolymer and a method for preparing the graft copolymer.

The Inventors have conducted extensive investigations to achieve the above-described object in making of the invention. In particular, the present invention relates to a polyolefin graft copolymer prepared by graft-copolymerizing an olefin monomer with a (meth)acryl macromonomer or an isobutylene macromonomer in the presence of a coordination polymerization catalyst based on a late transition metal complex.

The present invention will now be described in detail. The present invention relates to a polyolefin graft copolymer prepared by graft-copolymerizing an olefin monomer with a (meth)acryl macromonomer or an isobutylene macromonomer in the presence of a coordination polymerization catalyst based on a late transition metal complex. The coordination polymerization catalyst based on the late transition metal complex may be any as long as it is active in olefin polymerization. Preferable examples of the late transition metal are iron, cobalt, nickel, ruthenium, rhodium, palladium, osmium, iridium, and platinum belonging to Groups VIII to X. Nickel, palladium, and platinum of Group X are more preferred. Nickel and palladium are yet more preferred, and palladium is most preferred for their high tolerance against polar compounds.

Nonlimiting examples of the ligand in the late transition metal complex of the present invention include ligands that contain nitrogen, oxygen, phosphorus, and sulfur. For example, ligands disclosed in the following documents may be used: reviews of Chem. Rev. 2000, 100, 1169; Yuki Gosei Kagaku Kyokaishi (Journal of Synthetic Organic Chemistry, Japan), 2000, 58, 293; and Angew. Chem. Int. Ed. 2002, 41, 544; WO 97/17380; WO 97/48740; Chem. Commun. 2000, 301; Macromol. Symp. 2000, 150, 53; Macromolecules, 2001, 34, 1165; Macromolecules, 2001, 34, 1165; Macromolecules, 2001, 34, 2022; and the like. Among these, ligands containing two imine nitrogen atoms, in particular, an α-diimine ligand, is preferred for their synthetic ease.

After the coordination polymerization catalyst based on the late transition metal complex is reacted with a co-catalyst, an active species represented by General Formulae (1) and (2) below may be used:

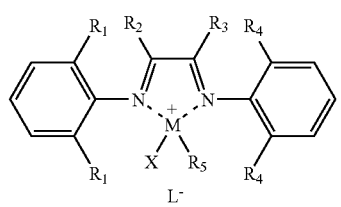

(1)

(wherein M is palladium or nickel; $R_1$ and $R_4$ are each independently a $C_1$-$C_4$ hydrocarbon group; $R_2$ and $R_3$ are each independently a hydrogen atom or a methyl group; $R_5$ is a halogen atom, a hydrogen atom, or a $C_1$-$C_{20}$ organic group; X is an organic group containing a heteroatom that can coordinate to M, wherein X may be connected to $R_5$ or may not be present; and $L^-$ is a predetermined anion)

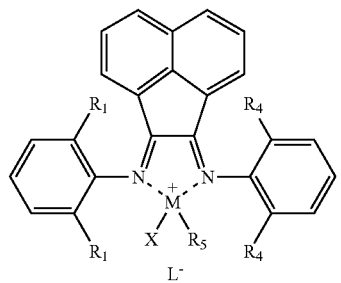

(2)

(wherein M is palladium or nickel; $R_1$ and $R_4$ are each independently a $C_1$-$C_4$ hydrocarbon group; $R_5$ is a halogen atom, a hydrogen atom, or a $C_1$-$C_{20}$ organic group; X is an organic group containing a heteroatom that can coordinate to M, wherein X may be connected to $R_5$ or may not be present; and $L^-$ is a predetermined anion.)

Examples of the molecule represented by X that can coordinate with M include polar compounds such as diethyl ether, acetone, methyl ethyl ketone, acetaldehyde, acetic acid, ethyl acetate, water, ethanol, acetonitrile, tetrahydrofuran, dimethylformamide, dimethyl sulfoxide, and propylene carbonate. Alternatively, there may be no X. When $R_5$ is a heteroatom, in particular, when $R_5$ contains carbonyl oxygen such as an ester bond, the carbonyl oxygen may function as X and coordinate to M. It is known that when polymerization with olefins is performed, olefins coordinate to M.

The counter anion represented by $L^-$ is produced together with a cation (M+) as a result of the reaction between a co-catalyst and a catalyst composed of an α-diimine ligand and a transitional metal. The counter anion may be any as long as it can form a non-coordinating ion pair in a solvent.

The α-diimine ligand in which each imine nitrogen atom has an aromatic group, i.e., a compound represented by $ArN=C(R_2)C(R_3)=NAr$, is preferred for its synthetic ease and high activity. Preferably, $R_2$ and $R_3$ are each a hydrocarbon group. In particular, $R_2$ and $R_3$ are preferably each a hydrogen atom, a methyl group, or a substance having the acenaphthene skeleton represented by General Formula (2) from the standpoint of synthetic ease and high activity. Use of an α-diimine ligand in which each imine nitrogen atom has a substituted aromatic group is effective from the standpoint of steric factors and is preferred since the molecular weight of the polymer tends to increase. Accordingly, Ar is preferably an aromatic group having a substituent, e.g., 2,6-dimethylphenyl, 2,6-diisopropylphenyl, or the like.

The auxiliary ligand ($R_5$) of the active species obtained from the late transition metal complex of the present invention is preferably a hydrocarbon group, a halogen group, or a hydrogen group due to the following reason. The cation ($Q^+$) of a co-catalyst described below abstracts halogen from the metal-halogen bond of the catalyst to produce salt; meanwhile, the cation (M+), i.e., an active species, having a metal-carbon bond, a metal-halogen bond, or a metal-hydrogen bond is produced from the catalyst. Thus, the cation must form a non-coordinating ion pair with the anion ($L^-$) of the co-catalyst. Specific examples of $R_5$ include methyl, chloro, bromo and hydrogen groups. In particular, methyl and chloro groups are preferred for their synthetic ease. Moreover, $R_5$ may be an organic group containing an ester bond having carbonyl oxygen that can coordinate to M, e.g., $R_5$ may be a group composed of methyl butyrate.

Olefin insertion to a $M^+$-halogen bond is rare compared to olefin insertion to a $M^+$-carbon bond (or a hydrogen bond). A hydrocarbon group (preferably a methyl group) and a halogen group (preferably a chloro group) are thus preferably selected as the auxiliary ligands of the catalyst. Accordingly, $R_5$ is most preferably a methyl group.

The co-catalyst can be represented by $Q^+L^-$. Q may be Ag, Li, Na, or K. Q is preferably Ag since halogen abstraction reaction can be readily completed. Inexpensive Na and K are also preferred. Examples of L include $BF_4$, $B(C_6F_5)_4$, $B(C_6H_3(CF_3)_2)_4$, $PF_6$, $AsF_6$, $SbF_6$, $(RfSO_2)_2CH$, $(RfSO_2)_3C$, $(RfSO_2)_2N$, and $RfSO_3$. In particular, $PF_6$, $AsF_6$, $SbF_6$, $(RfSO_2)_2CH$, $(RfSO_2)_3C$, $(RfSO_2)_2N$, and $RfSO_3$ are preferred since they are highly stable against polar compounds, and $PF_6$, $AsF_6$, and $SbF_6$ are more preferred for their synthetic ease and high commercial availability. From the standpoint of activity, $BF_4$, $B(C_6F_5)_4$, and $B(C_6H_3(CF_3)_2)_4$, and, in particular, $B(C_6F_5)_4$ and $B(C_6H_3(CF_3)_2)_4$ are preferred. Rf is a hydrocarbon group containing a plurality of fluorine groups. Fluorine groups are necessary for rendering non-coordinating anions, and the more the fluorine groups, the better. Nonlimiting examples of Rf include $CF_3$, $C_2F_5$, $C_4F_9$, $C_8F_{17}$, and $C_6F_5$. These may be used alone or in combination.

The molar ratio of late transition metal complex catalyst/co-catalyst is 1/0.1 to 1/10, preferably 1/0.5 to 1/2, and most preferably 1/0.75 to 1/1.25 because of the above-described reasons of activation.

The co-catalyst may be alkylaluminoxane, and preferably methylaluminoxane. Since such a co-catalyst is highly active, the co-catalyst is preferably put in inert gas atmosphere such as nitrogen or argon or in dry atmosphere. In general, for example, the methylaluminoxane abstracts one of the two hydrocarbon groups (preferably methyl groups), which are auxiliary ligands of the catalyst, to produce a cation (M+), i.e., an active species, having a metal-carbon bond. Meanwhile, the methylaluminoxane bonds with the methyl anion to form a counter anion (L−). When the auxiliary ligands of the catalyst are halogen groups such as chloro groups or bromo groups, ligand-exchange reaction occurs between the halogen groups and the trimethylaluminum in the methylaluminoxane to transform the auxiliary ligands of the catalyst to methyl groups. The ratio of the aluminum to the metal in the catalyst is preferably 10 to 1,000, and more preferably 20 to 500.

The olefin monomer used in the present invention may be any olefin having 2 to 20 carbon atoms. Nonlimiting examples include ethylene, propylene, 1-butene, 1-hexene, 1-octene, 1-decene, 1-hexadecene, 1-eicosen, 4-methyl-1-pentene, 3-methyl-1-butene, vinylcyclohexane, cyclopentene, cyclohexene, cyclooctene, and norbornene. A small amount of 1,3-butadiene, isoprene, 1,5-cyclooctadiene, norbornadiene, 5-vinyl-2-norbornene, 5-phenyl-2-norbornene, dimethanooctahydronaphthalene, ethylidene norbornene, dicyclopentadiene, or 1,4-hexadiene may also be used in combination. Among these, α-olefins having 10 or less carbon atoms are preferred. Examples thereof include ethylene, propylene, 1-butene, 1-hexene, and 1-octene. From the standpoint of properties such as transparency and the like, propylene is preferred. These olefin monomers may be used alone or in combination.

When propylene is used as the olefin monomer, a highly transparent polyolefin graft copolymer can be synthesized. The turbidity of a composite material prepared by melt mixing 15 parts by weight of the polyolefin graft copolymer using the propylene and the 100 parts by weight of polypropylene is preferably 35% or less, more preferably 30% or less. The polypropylene used here is not limited and any commercially available polypropylene can be employed. The method of melt mixing is not particularly limited, and any conventional method can be employed. Butyl rubber (IIR) or polyisobutylene (PIB) may be contained. The turbidity is defined as the optical characteristics whereby light is scattered and absorbed instead of directly passing through the sample. The turbidity in the present invention is determined by integrating-sphere electrophotometry (Japanese Industrial Standards (JIS) K7105) using Model NDH-300A manufactured by Nippon Denshoku Industries Co., Ltd. The turbidity is also referred to as "haze value".

The amount of the olefin monomer used is not limited. Preferably, the molar ratio of the olefin monomer/active species (lesser one of the catalyst and the co-catalyst) is 10 to $10^9$, more preferably 100 to $10^7$, and most preferably 1,000 to $10^5$. At an excessively small molar ratio, only a copolymer with a small molecular weight is obtained. At an excessively large molar ratio, the yield of the polymer relative to the monomer tends to be low.

The polyolefin in the polyolefin graft copolymer obtained by the present invention may have a highly branched structure, a 1,ω-insertion structure (refer to Chem. Rev. 2000, 100, 1169; Yuki Gosei Kagaku Kyokaishi (Journal of Synthetic Organic Chemistry, Japan), 2000, 58, 293), or an atactic structure when compared with that using early transition metal complexes. Late transition metal complexes cannot substantially control the insertion direction of olefin monomers having at least three carbon atoms due to the steric factors of the ligands; thus, stereoregularity does not readily appear (atactic). Accordingly, amorphous polymers are frequently obtained. Since amorphous polymers are soluble in solvents, the catalyst and the residue generated after polymerization can be easily removed by filtering, washing, adsorbing, or the like.

Ends of isobutylene macromonomers and (meth)acryl macromonomers used in the present invention are capped with carbon-carbon double bonds. Preferably, end groups are those that can readily undergo coordination polymerization. In particular, the end groups are preferably allyl groups (α-olefin structure), cyclic-olefins, styryl, or (meth)acryl. More preferably, the end groups are allyl groups since allyl groups readily undergo coordination polymerization, i.e., easily graft-copolymerize with olefins.

The isobutylene macromonomers of the present invention are macromonomers containing isobutylene as the primary component. For example, the isobutylene macromonomers are preferably prepared by living cation polymerization as disclosed in Polymer, 1995, 6, 579; Japanese Unexamined Patent Application Publication No. 8-134220; and Japanese Unexamined Patent Application Publication No. 10-204233. A typical examples of the initiator in preparing monofunctional macromonomers include 2-chloro-2,4,4-trimethylpentane and cumyl chloride. A typical example of the initiator in preparing bifunctional macromonomers is dicumyl chloride. However, these are nonlimiting examples. The number-average molecular weight (Mn) is 1,000 to 500,000, preferably 3,000 to 200,000, and more preferably 5,000 to 100,000. The molecular weight distribution (Mw/Mn) is 1.05 to 2.00, preferably 1.05 to 1.70, and most preferably 1.05 to 1.40. The number of ends may be three or more. Although macromonomers with three of more ends readily undergo gelation, they may be useful in some applications. Moreover, the isobutylene macromonomers of the present invention may contain other monomers, such as styrenes, that can be subjected to cationic polymerization.

In a preferred example, an allyl-terminated isobutylene macromonomer can be prepared by living cationic polymerization of isobutylene using a functionalizing agent (e.g., allylsilanes such as allyltrimethylsilane, or nonconjugated dienes such as 1,9-decadiene) for introducing allyl groups to the ends.

The (meth)acryl macromonomers of the present invention are macromonomers that contain (meth)acryl monomers as the primary component. The (meth)acryl macromonomers are preferably prepared by living anionic polymerization or controlled radical polymerization (Kobunshi (High Polymers, Japan) 1998, 47(2), 78; Mirai Zairyo (Expected Materials for the Future), 2001, 1(11), 14). In particular, as described in J. Am. Chem. Soc. 1995, 117, 5614; Macromolecules, 1995, 28, 7901; Science, 1996, 272, 866; Japanese Unexamined Patent Application Publication No. 2000-128924; Japanese Unexamined Patent Application Publication No. 2000-154255; Macromolecules, 1995, 28, 1721; Macromolecules, 1996, 29, 1070; Macromolecules, 1996, 29, 6979; and Macromolecules, 1997, 30, 2244, atom transfer radical polymerization (ATRP) is more preferred since living polymerization of (meth)acryl monomers can be easily performed in both laboratory scale and industrial scale and since introduction of functional groups is relatively easy. In synthesizing monofunctional macromonomers, ethyl 2-bromopropionate is typically used. In synthesizing bifunctional macromonomers, diethyl 2,5-dibromoadipinate is typically used. These typical examples are nonlimiting. The number-average molecular weight (Mn) is 1,000 to 500,000, preferably 3,000 to 200,000, and more preferably 5,000 to 100,000. The molecular weight distribution (Mw/Mn) is 1.05 to 2.00, preferably 1.05 to 1.70, and more preferably 1.05 to 1.40. Numerous (meth)acryl monomers are known, and at least one (meth)acryl monomer may be selected from these known (meth)acryl monomers according to the required function. The number of ends may be three or more. Although macromonomers with three of more ends readily undergo gelation, they may be useful in some applications. Moreover, the (meth)acryl macromonomers of the present invention may contain other monomers, such as styrenes, that can be subjected to radical polymerization.

In a preferred example, an allyl-terminated (meth)acryl macromonomer can be prepared through living radical polymerization of a (meth)acryl monomer using a functionalizing agent (e.g., allylic metal compounds such as allylic zinc, or nonconjugated dienes such as 1,7-octadiene) for introducing allyl groups to the ends.

When the (meth)acryl macromonomer and the isobutylene macromonomer used in the present invention each contain at least one carbon-carbon double bond (preferably, allyl or cyclic-olefin, and more preferably allyl at the ends) in the main chain, employment of the above-described living polymerization is not necessary. Various methods are available; for example, a (meth)acryl macromonomer containing at least one carbon-carbon double bond in the main chain may be prepared by copolymerizing monomers containing allyl groups or cyclic olefin structures, and preferably by copolymerizing (meth)acryl monomers containing allyl groups or cyclic olefin structures, such as allyl methacrylate, ethylene glycol dicyclopentenylether acrylate, or ethylene glycol dicylopentenylether methacrylate. The (meth)acryl macromonomer may be synthesized by any polymerization method. Preferably, the (meth)acryl macromonomer is synthesized by a radical (co)polymerization method selected from emulsion polymerization, dispersion polymerization, suspension polymerization, solution polymerization, and bulk polymerization.

According to the present invention, the step of graftcopolymerizing the olefin monomer with the (meth)acryl macromonomer or the isobutylene macromonomer may be performed in the presence of water, oxygen, or polar compounds. Thus, the macromonomers may be the form of microparticles, such as emulsion, miniemulsion, microemulsion, microsuspension, suspension, dispersion, or the like, or may be cross-linked. In particular, a crosslinked acryl coreolefin shell copolymer prepared by graft copolymerization of the macromonomer in an emulsion, microemulsion or miniemulsion state or a microsuspension state with an olefin monomer is highly compatible with polyolefin.

The graft copolymer of the present invention is synthesized at −30 to 200° C. and preferably at 0 to 100° C. The polymerization time is normally 10 minutes to 100 hours, and the reaction pressure is normal pressure to 10 MPa.

The polymerization of the graft copolymer of the present invention may be conducted in a system such as bulk, solution, suspension, dispersion, emulsified dispersion, or emulsion. The solvent is an aliphatic or aromatic solvent, which may be halogenated. Examples of the solvent include toluene, ethylbenzene, chlorobenzene, hexane, heptane, cyclohexane, methylcyclohexane, butyl chloride, and methylene chloride. A polar solvent such as tetrahydrofuran, diethyl ether, methyl ethyl ketone, ethyl acetate, or water may be used as the solvent. The polymerization atmosphere need not be inert gasses such as nitrogen or argon but may be dry oxygen or dry air. Inert gas, oxygen, or air may contain moisture, i.e., may be humid. Moreover, wet starting materials and/or polar compounds may be present. The polymerization is preferably conducted in a solution system; alternatively, an emulsified dispersion system or an emulsion system may be used.

The ratio of the chemically bonded macromonomer, i.e., the graft chain, in the graft copolymer of the present invention may be any. Preferably, the ratio of the macromonomer is 1 to 90 percent by weight and preferably 5 to 75 percent by weight relative to 100 percent by weight of the graft copolymer.

The weight-average molecular weight (Mw) of the graft copolymer of the present invention is 5,000 to 1,000,000 and, preferably 10,000 to 500,000. The molecular weight distribution (Mw/Mn) of the copolymer is 1.4 to 10 and preferably 1.4 to 3.

The number of the graft chains of the graft copolymer of the present invention is 0.1 to 50, and preferably 1 to 20. Here, the number of the graft chains is defined as the average number of the graft chains per graft copolymer after substantially complete incorporation (conversion) of the macromonomer into the graft copolymer or after substantially complete separation of unconverted macromonomers from the graft copolymer. The number of the polymer chains is calculated from the ratio of the weight to the molecular weight. The number of grafted macromonomers per graft copolymer is calculated by comparing the number of the synthesized polymer chains and the number of the chains of the starting macromonomers, and is defined as the number of the graft chains.

The graft copolymer may contain unconverted macromonomers in the entire weight. However, preferably, the graft copolymer is substantially free of unconverted macromonomers. This can be achieved by adjusting various polymerization conditions.

In particular, polypropylene-polyisobutylene graft copolymers can yield transparent composite materials even when the polypropylene-polyisobutylene graft copolymers contain unconverted isobutylene macromonomers or polypropylene homopolymers. This is because the system is put to a microphase separation state due to its compatibilizing effect and because the refractive index of the polypropylene (in particular, crystalline isotactic polypropylene commercially available) is relatively close to that of the polyisobutylene.

The composite material of the present invention contains the novel graft copolymer as the essential component but may also contain unconverted isobutylene macromonomers or polypropylene homopolymers. Moreover, the composite material may contain isobutylene rubbers such as polyisobutylene (PIB), isobutylene-isoprene rubber (IIR), or halogenated IIR. Furthermore, the composite material may contain at least one of amorphous polypropylene and crystalline polypropylene. The polypropylene-polyisobutylene graft copolymer still functions as the compatibilizing agent here, and a relatively transparent, soft, highly impact resistant composite material may be obtained. These polymers are preferably added to the copolymer through typical meltmixing processes. In particular, when crystalline polypropylene is used, a nucleating agent for polypropylene should also be added to prepare a composite material having high transparency, softness, and impact resistance.

The graft copolymer (including the composite material) containing the (meth)acryl macromonomer of the present invention is polar and in some cases transparent. The graft copolymer can be applied to primers for polyolefin, coating agents, adhesives, paints, polyolefin/filler composite materials, surfactants for polyolefin nanocomposites, and the like. The graft copolymer can be used in thermoplastic elastomers having polyolefin resin components and acryl polymer rubber components (the rubber may be crosslinked), in compatibilizing components of the impact-resistant plastics, and in thermoplastic elastomers having a (meth)acryl polymer constrained phase and a polyolefin rubber phase. Acryl core-olefin shell copolymers may be applied to thermoplastic elastomers and impact resistant plastics if polyolefin is contained as the resin component.

The graft copolymer and the composite material of the present invention may contain commonly available additives known in the plastic and rubber industries.

BEST MODE FOR CARRYING OUT THE INVENTION

The present invention will now be described in detail by way of EXAMPLES. The scope of the present invention is in no way limited by these examples.

SYNTHETIC EXAMPLE 1

In a 1-L separable flask equipped with a reflux tube and a stirrer, CuBr (3.6 g, 0.025 mol) was charged, and the interior of the reaction vessel was purged with nitrogen. Acetonitrile (62 mL) was added, and the mixture was stirred for 15 minutes at 70° C. in an oil bath. Butyl acrylate (36 mL, 0.25 mol), ethyl acrylate (50 mL, 0.46 mol), 2-methoxyethyl acrylate (37.5 mL, 0.29 mol), diethyl-2,5-dibromoadipate (15.0 g, 0.042 mol), and pentamethyldiethylene triamine (0.22 mL, 0.18 g, 1.05 mmol) (hereinafter simply "triamine") were added to the resulting mixture to initiate reaction. Butyl acrylate (144 mL), ethyl acrylate (200 mL) and 2-methoxyethyl acrylate (150 mL) were gradually added dropwise to the mixture over 210 minutes with stirring at 70° C. In the course of dropping the monomers, additional triamine (0.76 mL, 0.63 g, 3.7 mmol) was added. 330 minutes after the initiation of the reaction, 1,7-octadiene (124 mL, 92 g, 0.84 mol) and triamine (2.6 mL, 2.2 g, 0.013 mol) were added and the resulting mixture was stirred for 250 minutes at 70° C.

The reaction mixture was diluted with toluene and passed through an active alumina column. The volatile component was distilled under reduced pressure to prepare an acryl macromonomer having allyl groups at the two ends. The number-average molecular weight was 20,000, and the molecular weight distribution was 1.3.

SYNTHETIC EXAMPLE 2

A stirrer and a nitrogen line were attached to a 2-L separable flask. The flask was vacuumed using a vacuum line to dry the interior, and the pressure was returned to normal by purging nitrogen. Subsequently, methylene chloride (337 mL) and methylcyclohexane (447 mL), i.e., solvents, dried by molecular sieve treatment were introduced into the flask in a nitrogen flow. The flask was immersed in a dry ice-ethanol bath to cool the contents of the flask to −71° C. Isobutylene (109 g, 1,936 mmol) was introduced into the flask using pressure-glass liquefied gas collecting tube equipped with a needle valve connected to an isobutylene bottle. Methylene chloride/methylcyclohexane (5.6 mL/7.4 mL) prepared by dissolving cumyl chloride (3.88 mmol) and α-picoline (3.88 mmol) was added to the mixture. Subsequently, TiCl$_4$ (13.25 g, 69.8 mmol) was added to initiate polymerization. Fifty minutes after the initiation of the polymerization, allylsilane (0.443 g, 3.88 mmol) was added. The reaction was continued for two more hours, and the resulting reaction mixture was fed into deionized water to stop the reaction. The reaction mixture was washed with water three times, and the solvent was distilled to prepare an isobutylene macromonomer (PIB) having an allyl group at one end. The yield was approximately 100 g. The number-average molecular weight was 30,000, and the molecular weight distribution was 1.1.

SYNTHETIC EXAMPLE 3

Distilled water (35.4 mL), butyl acrylate (8.0 g), ethylene glycol dicyclopentenylether methacrylate (0.33 g), and stirrer chips were placed in a 300-mL four-necked flask equipped with a cooling tube and a three-way cock. Nitrogen bubbling was performed for 25 minutes to yield nitrogen atmosphere. Sodium dodecyl sulfate (0.9 g) was added to the mixture, and the mixture was stirred for ten minutes using a powerful magnetic stirrer to prepare an emulsion. The oil bath was set to a temperature of 85° C., and an ammonium persulfate/distilled water (0.016 g/0.16 mL) solution was added to the emulsion when the temperature of the flask content reached 74° C. to initiate polymerization. After 50 minutes, heating by using the oil bath was discontinued, and the reaction mixture was cooled to terminate the polymerization. The volume-average particle diameter (according to NICOMP) of the latex obtained was 36 nm (97%) and 106 nm (3%). The yield was 98%, and the solid content (SC) was 20.3%.

SYNTHETIC EXAMPLE 4

Methyl methacrylate (5 g), ethylene glycol dicyclopentenylether methacrylate (263 mg), and AIBN (326 mg) were charged in a 100-mL four-necked flask equipped with a three-way cock, a cooling tube, and a thermometer under nitrogen atmosphere. The mixture was polymerized in hot water bath for 1 hour at 60° C. The system was cured while producing foams. After cooling, polymers were recovered by washing with methanol. The yield after drying was 5.15 g (98%).

SYNTHETIC EXAMPLE 5

[{2,6-(iPr)$_2$C$_6$H$_3$}N=CMe-CMe=N{2,6-(iPr)$_2$C$_6$H$_3$}] PdMeCl (hereinafter, simply "[N^N]PdMeCl") was prepared according to J. Am. Chem. Soc. 1995, 117, 6414.

Polymerization was performed in air at room temperature using a 100-mL pear-shaped flask equipped with a three-way cock. Stirrer chips were contained in the flask. Each reagent (except for [N^N]PdMeCl) purchased was used directly without drying.

Methylene chloride (5 mL), 1-hexene (3.36 g, 40 mmol), and a solution of [N^N]PdMeCl (11.2 mg, 20 μmol) and THF (0.25 mL) were charged into the flask. A solution of AgSbF$_6$ (6.87 mg, 20 μmol, purchased from Sigma-Aldrich Co.) and THF (0.25 mL) was added to initiate polymerization. The color of the solution changed from orange to light yellow immediately. The solution became gradually viscous as the polymerization progressed. Five hours later, methanol was added to recover the produced polymer. The polymer was dried under reduced pressure. The yield of the polymer after drying was 2.3 g (68%). The prepared polymer was soluble in hexane, chloroform, and dichloroform at room temperature. The number-average molecular weight according to GPC (chloroform, 35° C.) was 100,000, and the molecular weight distribution was 1.4.

EXAMPLE 1

In SYNTHETIC EXAMPLE 5, PIB having allyl groups at the two ends (EPION EP600A, number-average molecular weight: 15000, Mw/Mn: 1.14, manufactured by Kaneka Corporation) (1.83 g, 114 μmol) was added to initiate polymerization. The color of the solution changed from orange to light yellow immediately. The system gradually became spherical as the solvent was incorporated. This phenomenon indicated the progress of gelation and production of a polyhexene/PIB graft copolymer. Five hours later, methanol was added, and the polymer produced was recovered and dried under reduced pressure. The yield of the polymer after drying was 3.9 g (75%) and was 2.9 g (gel content: 74%) after washing with hexane.

EXAMPLE 2

A solution of the acryl macromonomer having allyl groups at two ends prepared in SYNTHETIC EXAMPLE 1 (1.80 g, 90 μmol) and 1-hexene (3.36 g, 40 mmol), a solution of [N^N]PdMeCl (22.5 mg, 40 μmol) and THF (0.5 mL), and methylene chloride (5 mL) were charged into the flask. A solution of $AgSbF_6$ (13.7 mg, 40 μmol) and THF (0.5 mL) was added to initiate polymerization. The system gradually became spherical as the solvent was incorporated. This phenomenon indicated the progress of gelation and production of a polyhexene/acryl-polymer graft copolymer. Five hours later, the polymer produced was recovered and dried under reduced pressure. The yield of the polymer after drying was 3.6 g (70%).

EXAMPLE 3

Polymerization was conducted as follows. Into 50 mL stainless steel autoclave, PIB having allyl groups at the two ends (0.8 g, EPION EP600A, number-average molecular weight: 15,000, Mw/Mn: 1.14, manufactured by Kaneka Corporation) and stirrer chips were placed. Subsequently, methylene chloride (5 mL) was fed into the flask, and the mixture was stirred at room temperature to prepare a solution. A solution containing [N^N]PdMeCl (11.2 mg, 20 μmol) and THF (0.25 mL) and a solution containing $AgSbF_6$ (6.87 mg, 20 μmol) and THF (0.25 mL) were added to the resulting solution. The mixture was cooled using a dry ice/methanol bath (to slightly reduce the pressure, hereinafter the same), and propylene (2 L, 89 mmol) was introduced to the autoclave. The polymerization was progressed in a water bath at room temperature. After approximately 24 hours, reprecipitation in methanol was performed, and the polymer was recovered. The polymer was dried, the hexane-soluble components were filtered, and the filtrate was dried again and weighed. The yield was 2.6 g (57%).

The GPC curve (chloroform, 35° C.) was bimodal (Mp: 190,000 for the high-molecular fraction and Mp: 15,000 for low-molecular fraction). The Mp for the low-molecular fraction was correspondent with the allyl-terminated PIB of the starting material. The system was transparent. Thus, the system was identified as a polypropylene (PP)/PIB/PP-g-PIB composite material. Moreover, transparency of the system indicated that the graft copolymer was synthesized relatively effectively.

COMPARATIVE EXAMPLE 1

The same process as in EXAMPLE 3 was performed except that instead of using the PIB having allyl groups at the two ends during the polymerization, the PIB was blended with the polypropylene produced as a result of the polymerization. The propylene and the PIB with allyl groups at the two ends were dissolved in hexane at room temperature. After vaporization of hexane, drying was performed again under reduced pressure. The resulting polymer was opaque.

EXAMPLE 4

Polymerization was conducted as follows. Into a 50 mL autoclave, a PIB having allyl groups at the two ends (0.8 g, EPION EP600A, number-average molecular weight: 15000, Mw/Mn: 1.14, manufactured by Kaneka Corporation) and stirrer chips were placed. The autoclave was purged with nitrogen. Methylene chloride (5 mL) and a methylaluminoxane/toluene (approximately 2 mmol of aluminium/3.2 ml, purchased from Tosoh Finechem Corporation) solution were added to the PIB, and the mixture was stirred at room temperature to prepare a solution. A $[N^N]NiBr_2$ (prepared as with [N^N]PdMeCl according to the previously mentioned report)/toluene (20 μmol/0.29 ml) solution was added, and the resulting mixture was cooled in a dry ice/methanol bath. Subsequently, propylene (2 L, 89 mmol) was introduced to the autoclave. The polymerization progressed in a water bath at room temperature. After approximately 24 hours, reprecipitation in methanol was performed, and the polymer was recovered. The polymer was dried, the hexane-soluble components were filtered, and the filtrate was dried again and weighed. The yield was 4.4 g (96%).

The GPC curve was substantially unimodal and indicated that almost all allyl-terminated PIB grafted to PP (Mn 73,000, Mw/Mn: 2.1). The number of polymer chains was calculated from the ratio of the weight to the molecular weight. The comparison between the number of the chains of the synthesized polymer and the number of the chains of the allyl-terminated PIB of the starting material, showed that 0.9 PIB was grafted per graft copolymer. Moreover, the system was transparent.

It should be noted that in an experiment conducted by tripling the amount of the starting materials using a 100-mL autoclave, the system underwent gelation. The yield was 14 g, and the gel content was 76% (after hexane washing).

EXAMPLE 5

Polymerization was conducted as follows. Into a 100-mL autoclave, the PIB having an allyl group at one end (5.1 g, Mn: 30,000, Mw/Mn: 1.1) synthesized in SYNTHETIC EXAMPLE 2 and stirrer chips were placed. The autoclave was purged with nitrogen. Methylene chloride (20 mL) and a methylaluminoxane/toluene (approximately 6 mmol of aluminium/9.6 ml) solution were added to the PIB, and the mixture was stirred at room temperature to prepare a solution. A $[N^N]NiBr_2$/toluene (60 μmol/0.87 ml) solution was added, and the resulting mixture was cooled in a dry ice/methanol bath. Subsequently, propylene (6 L, 267 mmol) was introduced to the autoclave. The polymerization progressed in a water bath at room temperature. After approximately 24 hours, reprecipitation in methanol was performed, and the polymer was recovered. The polymer was dried, the hexane-soluble components were filtered, and the filtrate was dried again and weighed. The yield was 13.2 g (81%).

The small peak derived from the starting allyl-terminated PIB appeared in the GPC curve (Mn 50,000; Mw/Mn: 2). Almost all of the allyl-terminated PIB were presumably grafted. Accordingly, 0.7 PIB was grafted per graft copolymer.

In order to study the graft copolymer's capability of rendering transparency to commercially available PPs, melt mixing of the graft copolymer and commercially available PP was investigated. A random PP (MI 2, manufactured by Ground Polymer Co., Ltd., F232DC, 20 g) and the PP-g-PIB (3 g) synthesized as above were placed in a 30-ml plastomill (manufactured by Toyo Seiki Kogyo Co., Ltd.) and were mixed for 10 minutes at 200° C. and 100 rpm. Subsequently, a press sheet 1 mm thick was prepared by a typical method (conditions: 200° C., no pressure, 10 minutes→200° C., 1 kgf/m², 10 minutes→200° C., 50 kgf/m², 10 minutes→room temperature, 50 kgf/m², 5 minutes).

The turbidity of the press sheet was 57%, which was lower than that (64%) of a system composed of the random PP only and that (71%) of a random PP (20 g)/IIR (Butyl 065 manufactured by Japan Butyl Co., Ltd., 3 g) system.

EXAMPLE 6

Polymerization was performed as in EXAMPLE 5 except that the PIB having the allyl group at one end synthesized as in SYNTHETIC EXAMPLE 2 (2.7 g, Mn: 4000, Mw/Mn: 1.1) and methylene chloride (15 mL) were used. The yield was 12.1 g (87%).

The GPC curve was substantially unimodal, and indicated that almost all allyl-terminated PIB grafted to PP (Mn 89,000, Mw/Mn: 1.7). The comparison between the number of the chains of the synthesized polymer and the number of the chains of the allyl-terminated PIB of the starting material, showed that 5.0 PIB grafted per graft copolymer. Moreover, the system was transparent.

As in EXAMPLE 5, a press sheet was prepared using a random PP (MI 20, manufactured by Ground Polymer Co., Ltd., J226EA, 20 g) and the PP-g-PIB (3 g) synthesized as above through melt-mixing. The turbidity of the press sheet was 26%, which was lower than that (31%) of a system composed of the random PP only and that (47%) of a random PP (20 g)/IIR (Butyl 065, 3 g) system.

In a TEM photograph (JEOL Ltd., JEM-1200EX, $RuO_4$ stain, ultrathin section) of the press sheet, not only dispersed particles of approximately 200 nm or less but also micro-dispersion graft copolymers having diameters so small that they were not measurable were identified. On the other hand, in the random PP/IIR system, IIR dispersed particles of 1 to 5 μm were observed.

In general, IIR and PIB have low compatibility with commercially available PPs and give negative effects on transparency. On the other hand, although PP-g-PIB has PIB segments, it also has PP segments; thus, PP-g-PIB is highly compatible with commercially available PP and can effectively render transparency.

EXAMPLE 7

Polymerization was performed as in EXAMPLE 5 except that a PIB having an allyl group at on end (5.1 g, Mn: 15,000, Mw/Mn: 1.1) prepared as in SYNTHETIC EXAMPLE 2 and methylene chloride (20 mL) were used. The yield was 13.7 g (83%).

The GPC curve was substantially unimodal, and indicated that almost all allyl-terminated PIB grafted with PP (Mn 40,000, Mw/Mn: 2.2). The comparison between the number of the chains of the synthesized polymer and the number of the chains of the allyl-terminated PIB of the starting material, showed that one PIB grafted per graft copolymer. Moreover, the system was transparent.

As in EXAMPLE 5, a press sheet was prepared using a random PP (MI 20, 20 g) and the PP-g-PIB (3 g) synthesized as above through melt-mixing. The turbidity of the press sheet was 27%, which was lower than that (31%) of a system composed of the random PP only. As in EXAMPLE 6, the TEM photograph showed that not only dispersed particles of approximately 200 nm or less but also micro-dispersion graft copolymers having diameters so small that they were not measurable were observed. Moreover, whereas the turbidity of the random PP (20 g)/PIB (3 g, Mn: 45,000, allyl groups at the two ends) system was 42%, the turbidity of the random PP (20 g)/PIB (3 g)/PP-g-PIB (3 g) system was as low as 32%, which is comparable to that of the system composed of random PP only.

As described above, transparency can be rendered or maintained not only with commercially available PP/PP-g-PIB systems but also with commercially available PP/PP-g-PIB/PIB systems.

EXAMPLE 8

Polymerization was conducted as follows. Into a 100-mL autoclave, a butyl acrylate macromonomer having allyl groups at the two ends (PBA) (2.4 g, Mn: 25,000, Mw/Mn: 1.6) prepared as in SYNTHETIC EXAMPLE 1, [N^N] PdMeCl (60 μmol), $AgSbF_6$ (60 μmol), and stirrer chips were charged. The autoclave was purged with nitrogen. Methylene chloride (15 mL) was added, and the mixture was stirred at room temperature to prepare a solution. The solution was cooled in a dry ice/methanol bath. Propylene (6 L, 267 mmol) was introduced into the autoclave. The polymerization progressed in a water bath at room temperature. After approximately 24 hours, the polymer was recovered and dried. The hexane-soluble components were filtered, and the filtrate was dried again and weighed. The yield was 7.9 g (58%).

The small peak derived from the starting allyl-terminated PBA appeared in the GPC curve (Mn 82,000; Mw/Mn: 2.5). Almost all of the allyl-terminated PBA were presumably grafted. Accordingly, one PBA was grafted per graft copolymer. The system was transparent. The transparency of the system also supports effective graft copolymer synthesis.

As in EXAMPLE 5, a press sheet was prepared using a random PP (MI 20, J226EA, or MI 2, F232DC; 20 g) and the PP-g-PBA (3 g) synthesized as above, through melt-mixing. A TEM photograph of the press sheet showed that the PP-g-PBA had some degree of compatibility with commercially available PP, although the degree is not as high as that of the PP-g-PIB, in which dispersed particles of the graft copolymer of approximately 1 μm or less were observed in the TEM photograph.

In order to examine the polarity of the graft copolymer, the water contact angle of a hexane cast film of the PP-g-PBA was measured (Kyowa Interface Science Co., Ltd., contact angle meter, Model CA-S150). The hexane cast film was transparent, and the water contact angle thereof was 90 to 100 degrees, which was comparable to that of the commercially available PP. On the other hand, the contact angle after the film was subjected to heat reflux in 0.6 N ethanolic KOH for one hour decreased to 70 to 75, which is comparable to that of the commercially available acrylic resin. The decrease is presumably due to generation of carboxylic groups resulting from hydrolysis of butyl esters. Thus, it was found that the surface of PP could be polarized by using suitable functional groups in the graft chains (macromonomers).

EXAMPLE 9

Into a 50-mL autoclave, a PIB having an allyl group at one end (0.9 g, Mn: 4,000, Mw/Mn: 1.1) prepared as in SYNTHETIC EXAMPLE 2, [N^N]PdMe$^+$B(C$_6$F$_5$)$_4^-$ (8.5 µmol) (prepared according to WO97/17380), and stirrer chips were charged. Methylene chloride (5 mL) was added, and the mixture was stirred at room temperature in air to prepare a solution. The solution was cooled in a dry ice/methanol bath. Propylene (2 L, 89 mmol) was introduced into the autoclave. The polymerization progressed in a water bath at room temperature. After approximately 24 hours, reprecipitation in methanol was performed, and the polymer was recovered. The polymer was dried, the hexane-soluble components were filtered, and the filtrate was dried again and weighed. The yield was 3.0 g (65%).

The GPC curve (chloroform, 35° C.) was bimodal (Mp: 510,000 for the high-molecular fraction and Mp: 4,000 for low-molecular fraction). The Mp for the low-molecular fraction was correspondent with the allyl-terminated PIB of the starting material. The system was transparent.

EXAMPLE 10

Into a 50-mL autoclave, a PBA having an allyl group at one end (0.97 g, Mn: 25,000, Mw/Mn: 1.6) prepared as in SYNTHETIC EXAMPLE 1, methylene chloride (2.5 mL), toluene (2.5 mL), and stirrer chips were charged. The mixture was stirred at room temperature in air to prepare a solution. Subsequently, a solution containing [N^N]PdMe$^+$B(C$_6$F$_5$)$_4^-$ (19 µmol)(prepared according to WO97/17380) and methylene chloride (0.5 mL) were added to the above solution. The polymerization was progressed under ethylene pressure (approximately 2 to 1.6 MPa) in a water bath at room temperature. After approximately 24 hours, polymer was recovered. After filtering hexane/toluene-soluble components, the filtrate was dried again and weighed. The yield was 6 g.

The GPC curve (chloroform, 35° C.) was bimodal (Mp: 150,000 for the high-molecular fraction and Mp: 25,000 for low-molecular fraction). The Mp for the low-molecular fraction was correspondent with the allyl-terminated PBA of the starting material. Moreover, the system was transparent.

EXAMPLE 11

Into a 100-mL autoclave, the methyl methacrylate macromonomer containing the cyclic olefin structure synthesized in SYNTHETIC EXAMPLE 4 (0.82 g) and stiffer chips were charged. Methylene chloride (2.5 mL) and toluene (2.5 L) were added, and the resulting mixture was stirred at room temperature. A solution containing [N^N]PdMe$^+$B(C$_6$F$_5$)$_4^-$ (19 µmol)(prepared according to WO97/17380) and methylene chloride (0.5 mL) was added to the mixture, and polymerization was progressed under an ethylene pressure (approximately 2 to 1.6 MPa) in a water bath at room temperature. After approximately 24 hours, polymer was recovered. The insoluble components after hexane washing weighed 1.12 g. The $^1$H-NMR (300 MHz, CDCl$_3$) of the hexane-insoluble components had peaks indicating PMMA and polyethylene, thereby indicating the presence of the graft copolymer. Note that since the polyethylene obtained in this system has a branched structure, the polyethylene is amorphous and is soluble in hexane or dichloroform at room temperature.

EXAMPLE 12

Into a 100-mL autoclave, [N^N]PdMe$^+$B(C$_6$F$_5$)$_4^-$ (76 µmol) (prepared according to WO97/17380) and stirrer chips were charged. The autoclave was purged with nitrogen. Methylene chloride (0.5 mL) and the butyl acrylate macromonomer latex containing the cyclic olefin structure synthesized in SYNTHETIC EXAMPLE 3 (5.0 mL, subjected to 15 min of nitrogen bubbling, solid content: 1.0 g) were added, and the resulting mixture was subjected to 200 W ultrasonic cleaning apparatus for two minutes. Under an ethylene pressure (approximately 2 to 1.6 MPa), polymerization was progressed in a water bath at room temperature. After six hours, the latex and the solid precipitates were separated and recovered separately.

The volume-average particle diameter of the latex was 48 nm (85%) and 122 nm (15%), which was larger than that of the starting latex. The $^1$H-NMR (300 MHz, CDCl$_3$) of the polymer after latex was salted out (yield: 1.6 g) and the polymer washed with hexane after salting-out had peaks indicative of PBA and polyethylene, thereby indicating the presence of the graft copolymer. Since the polyethylene obtained in this system has a branched structure, the polyethylene is amorphous and is soluble in hexane or dichloroform at room temperature. Note that some toluene-insoluble components, i.e., gel components, were detected in each case (45% after salting out, and 94% after hexane washing). This fact indicates the progress of the graft copolymerization. On the other hand, almost all of the solid precipitates (yield: 6.0 g) were polyethylene according to $^1$H-NMR. No gel components were detected.

When polymerization was conducted for one hour using 19 µmol of [N^N]PdMe$^+$B(C$_6$F$_5$)$_4^-$, the yield of the polymer after salting out was 1.4 g, and substantially no solid precipitates were produced (approximately 0.2 g). The presence of the graft copolymer and the progress of the graft copolymerization were confirmed as in above using $^1$H-NMR after hexane washing or measurement of the gel components.

EXAMPLE 13

Into a 100-mL autoclave, [N^N]PdMe$^+$B(C$_6$F$_5$)$_4^-$ (38 µmol) (prepared according to WO97/17380) and stirrer chips were charged. The autoclave was purged with nitrogen. Methylene chloride (0.25 mL) and a macromonomer latex (5.0 mL, particle diameter: 36 nm, 15 minutes nitrogen bubbling, solid content: 1.0 g) synthesized as in SYNTHETIC EXAMPLE 3 but with allyl methacrylate instead of ethylene glycol dicyclopentenylether methacrylate were added, and the mixture was subjected to 200 W ultrasonic cleaning apparatus for two minutes. Under a ethylene pressure (approximately 2 to 1.6 MPa), the polymerization was progressed in a water bath at room temperature. After 20 hours, the latex and the solid precipitates were separated and recovered separately.

The volume-average particle diameter of the latex obtained together with the solid precipitates was 43 nm, which is larger than that of the starting latex. The $^1$H-NMR (300 MHz, CDCl$_3$) of the polymer after salting out the latex (yield: 0.52 g) and the polymer after hexane-washing after the salting out had peaks indicative of PBA and polyethylene, thereby indicating the presence of the graft copolymer.

Note that toluene-insoluble components, i.e., gel components, were detected in each case. This fact indicates the progress of the graft copolymerization.

INDUSTRIAL APPLICABILITY

As has been described above, by using a coordination polymerization catalyst based on a late transition metal complex, graft copolymers of olefins and isobutylene macromonomers or various (meth)acryl macromonomers were obtained in air, in the presence of wet materials, in the presence of polar compounds, and/or in water. The polyolefin in the polyolefin graft copolymer was amorphous. In particular, the graft copolymer (composite material) of polypropylene and polyisobutylene was transparent and showed high dispersibility. Moreover, the graft copolymer (composite material) of polypropylene and polybutyl acrylate was transparent and had a low water contact angle under particular conditions. Thus, polyolefin graft copolymers having novel structures or characteristics were prepared by simple processes.

The invention claimed is:

1. A polyolefin graft copolymer prepared by graft-copolymerizing an olefin monomer with a (meth)acryl macromonomer in the presence of a coordination polymerization catalyst based on a late transition metal complex, wherein the transition metal is selected from Groups VIII to X of the periodic table, wherein the (meth)acryl macromonomer is prepared by atom transfer radical polymerization and wherein the (meth)acryl macromonomer has an allyl functional group.

2. A polyolefin graft copolymer prepared by graft-copolymerizing an olefin monomer with a (meth)acryl macromonomer in the presence of a coordination polymerization catalyst based on a late transition metal complex, wherein the transition metal is selected from Groups VIII to X of the periodic table and the (meth)acryl macromonomer is prepared by (co)polymerizing at least one monomer selected from the group consisting of allyl methacrylate, ethylene glycol dicyclopentenyl ether acrylate and ethylene glycol dicyclopentenyl ether methacrylate.

3. A composite material comprising a transparent polyolefin graft copolymer, the composite material comprising:

(A) 15 parts by weight of a polyolefin graft copolymer prepared by graft-copolymerizing an olefin monomer with a (meth)acryl macromonomer or an isobutylene macromoner in the presence of a coordination polymerization catalyst based on a late transition metal complex, wherein the transition metal is selected from Groups VIII to X of the periodic table, wherein the olefin monomer is propylene, and (B) 100 parts by weight of a polypropylene, the composite material being in the form of a 1 mm thick sheet having a turbidity of 35% or less.

4. A method for making a polyolefin grafted copolymer by graft-copolymerizing an olefin monomer with a (meth)acryl macromonomer or an isobutylene macromonomer in the presence of a coordination polymerization catalyst based on a late transition metal complex, wherein the transition metal is selected from Groups VIII to X of the periodic table.

5. A method for making a composite material comprising:

(A) making a polyolefin grafted copolymer by graft-copolymerizing an olefin monomer with a (meth)acryl macromonomer or an isobutylene macromonomer in the presence of a coordination polymerization catalyst based on a late transition metal complex, wherein the transition metal is selected from Groups VIII to X of the periodic table; and (B) mixing the polyolefin grafted copolymer with polypropylene.

6. A polyolefin graft copolymer prepared by graft-copolymerizing an olefin monomer with a (meth)acryl macromonomer in the presence of a coordination polymerization catalyst based on a late transition metal complex, wherein the transition metal is selected from Groups VIII to X of the periodic table and the (meth)acryl macromonomer is prepared by radical (co)polymerizing a (meth)acryl monomer containing an allyl group or a cyclic olefin structure.

* * * * *